C. J. THORNTON.
DUMPING VEHICLE BODY.
APPLICATION FILED NOV. 25, 1921.

1,434,168.

Patented Oct. 31, 1922.
2 SHEETS—SHEET 1.

Civilian J. F. Thornton
INVENTOR.

By Geo. B. Willey
ATTORNEY

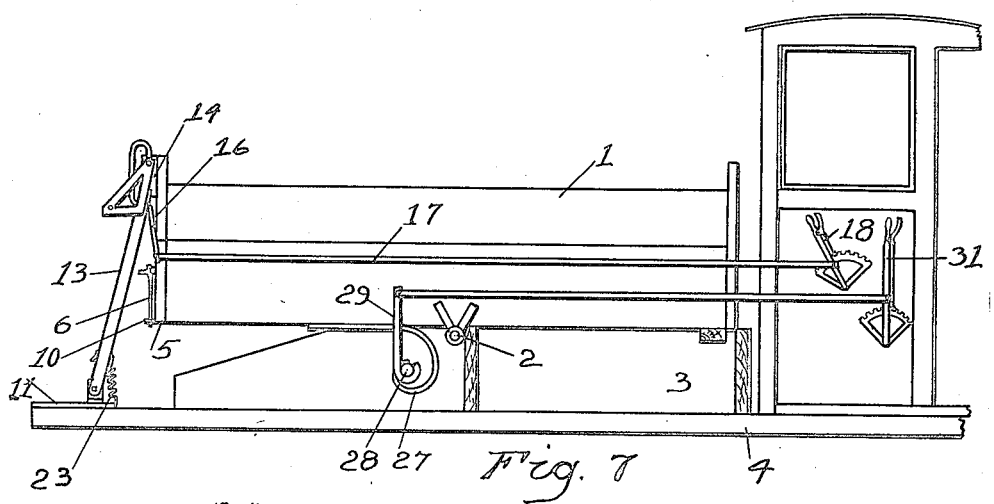
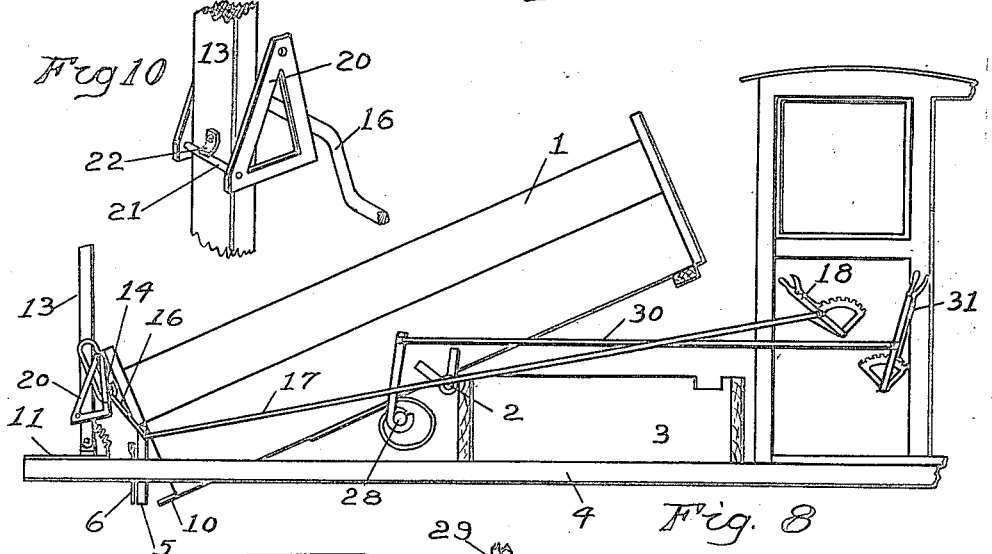
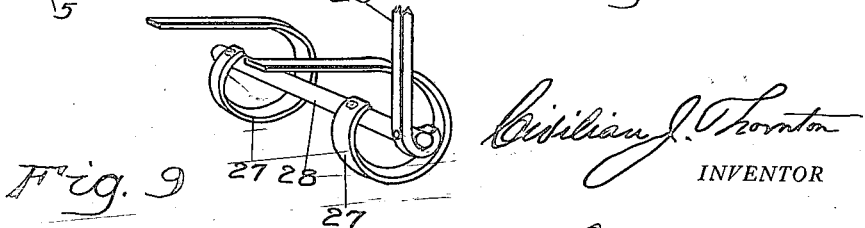

Patented Oct. 31, 1922.

1,434,168

UNITED STATES PATENT OFFICE.

CIVILIAN J. THORNTON, OF MILLINGTON, MICHIGAN.

DUMPING VEHICLE BODY.

Application filed November 25, 1921. Serial No. 517,637.

*To all whom it may concern:*

Be it known that I, CIVILIAN J. THORNTON, a citizen of the United States, residing at Millington, in the county of Tuscola and State of Michigan, have invented certain new and useful Improvements in Dumping Vehicle Bodies; and I do hereby declare the following to be a full, clear, and exact description of the invention, such as will enable others skilled in the art to which it appertains to make and use the same.

This invention relates to improvements in vehicles and relates more particularly to dumping bodies for motor-driven trucks, wagons and similar vehicles.

The objects of my improvement are to provide a simple and inexpensive dumping body that can be automatically dumped and returned to its horizontal position by one man and that may also be capable of being operated from the driver's seat when desired.

My improvement includes certain novel devices for positively holding the dumping body in its horizontal position while the load is being transported and to permit the body to be tilted for dumping and to be automatically locked in its downwardly tilted position until the operator desires to restore the body to its horizontal position. Means is also provided for unlocking the body while in its locked or tilted position, restoring it to the horizontal position and again locking it, thus giving the operator complete control of the operation of the tilting body, not only while in its horizontal or transporting position, but also in its tilted or dumping position.

With the foregoing and certain other objects in view, which will appear later in the specifications, my invention comprises the devices described and claimed and the equivalents thereof.

In the drawings, Fig. 1 is a perspective view of the tilting body in its horizontal position.

Fig. 7 is a part sectional side elevation, showing a modified form of device for restoring the body from its dumping position to its horizontal position.

Fig. 8 is a similar view of the same, showing the body in its dumping position.

Fig. 9 is a perspective detail of the springs employed in the modified form shown in Figs. 7 and 8.

Fig. 10 is a perspective detail of a preferred form of latch for holding the body down in its dumping position.

Figure 1:
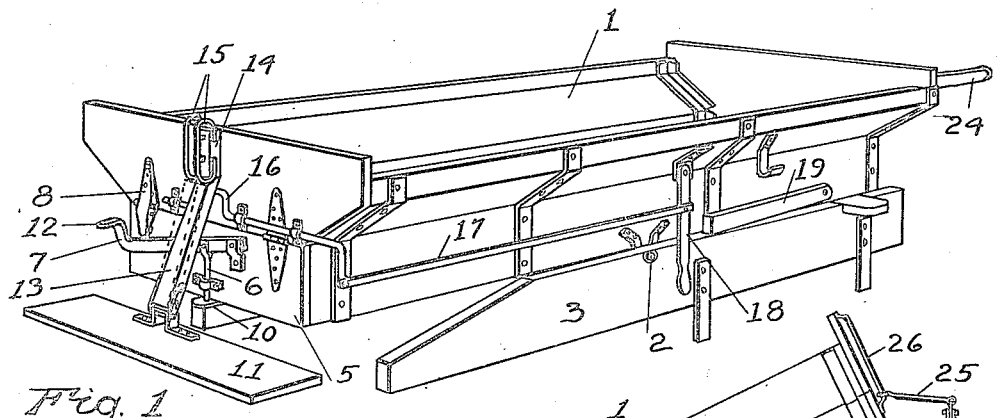

As is clearly shown in the drawings, the device consists in the usual dumping body 1 pivotally supported just forward of the middle of its length upon pivots 2, which are carried by suitable bearings in sills 3 that are mounted on the frame 4 of the truck.

Figure 2:
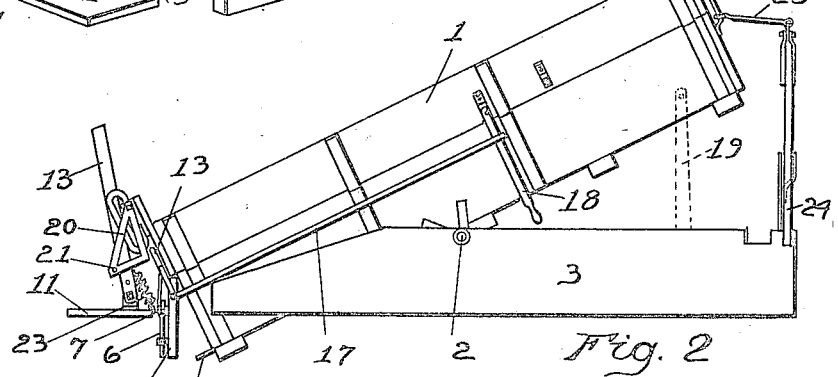
Fig. 2 is a side elevation of the same in its dumping position.

A swinging door 5 is hinged horizontally to the back end of the body, so as to swing outwardly from below, as shown in Figs. 2 and 8. The door 5 may be held in its closed position by means of a bolt 6, which is pivoted at its upper end to a vertically movable arm 7, one end of which is pivoted to the door 5, the free end of the arm adapted to be releasably engaged by a spring 8, which is preferably secured to one of the hinges 9, so that when the door is closed and the bolt 6 is received in a socket 10 carried by the body 1, the arm 7 will be out of engagement with the spring 8. When the arm 7 is raised and bolt 6 is unlocked and the body tilted, then the arm 7 is engaged by the spring, as shown in Fig. 6.

Figures 5, 6:
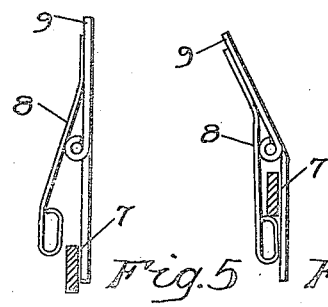
Fig. 5 is a combined sectional detail of the combined hinge and spring latch by which the lever that actuates the locking bolt is engaged.
Fig. 6 is a similar view, showing the locking bolt lever in place.

The tilting of the body, as indicated in Fig. 6, holds the spring 8 in such position that it retains the arm 7, but when the body is again restored to its horizontal position, the spring 8 releases the arm 7, as indicated in Fig. 5, allowing the bolt 6 to drop into its socket 10.

When the body is started from its horizontal position and tilted to be dumped, the bolt 6 remains locked until the body has almost reached its lowermost position. The bolt 6 is then automatically unlocked by the engagement of the arm 7 with a stationary member, as board 7, on the frame. For this purpose the arm 7 may be provided with an outwardly projecting lug 12, which catches on the board 11 when the body is tilted.

Figure 3:
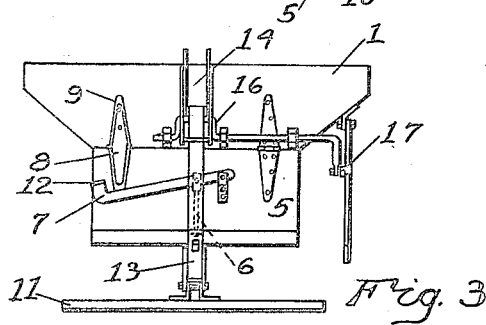
Fig. 3 is a rear view of the parts shown in Fig. 1.

To hold the body in its horizontal position when loaded and to prevent its accidental tilting, I provide a strut or brace 13, which is preferably hinged at its lower end to a stationary member 11, its upper end adapted to releasably engage a lug or equivalent projection 14 secured to the upper part of the rear end board of the body 1, as shown in Figs. 1 and 3.

To prevent displacement of the strut 13 sidewise with respect to the lug 14, I prefer to provide on this lug a pair of guides 15, there being one of these guides at each side of the lug 14. The strut 13 may be disengaged from the lug 14 by being pushed downwardly as indicated by dotted lines. When the body is tilted, as shown in Fig. 2, the strut 13 will be guided between the guides 15, and when the body 1 is restored to its horizontal position, the strut 13 will automatically drop into place underneath the lug 14, as shown in Fig. 1.

To conveniently release the upper end of strut 13 I prefer to provide an offset rocking bar 16, or its equivalent, which may be pivoted to the rear end of body 1 and may be rocked by means of a link 17 and a lever 18 pivoted thereto, within convenient reach of the operator.

In Fig. 2, lever 18 is shown as being located at the side of the dumping body, but it may if desired be located at the right side of the cab, as shown in Fig. 7, or at the left side near the driver's seat.

To hold the body in its tilted position any suitable means may be provided.

In Figs. 1 and 2, I have shown at 19 a bar pivoted at one end to the body 1, so that when the front end of the body is raised, as shown in Fig. 2, the bar 19 will assume the position shown by dotted lines and act as a post to support the body in its tilted position.

I have also shown in Fig. 2 a modified means for holding the body in its downwardly tilted position. This second latch or locking means may be employed in conjunction with the bar 19, or it may be used in place of the bar. It consists primarily in a hinged bracket suspended from the upper end of the lug 14 and carrying a pin 21 or its equivalent adapted to ride up and down along the outer face or strut 13 when the tilting body is raised or lowered. The device is shown more in detail in Fig. 10.

A suitable lug 22, Fig. 10, is adapted to be engaged by the pin 21 when the body is in the tilted position shown in Fig. 8 and may be disengaged therefrom by the offset rocking bar 16. The bar 16 pushes the strut 13 outwardly and releases it from lug 14, permitting the body 1 to be restored to its horizontal position. The pin 21 on bracket 20 thereupon engages lug 22 and locks the body in its tilted position, as shown in Figs. 8 and 10. A second operation of the rocking bar 16 releases the pin 21 from the lug 22 and permits the body to return to its horizontal position.

If desired, a spring 23, or its equivalent may be secured to the strut 13 and to a stationary member of the frame, as shown in Figs. 2 and 7, to normally hold the strut 13 against the lug 14.

Figure 4:
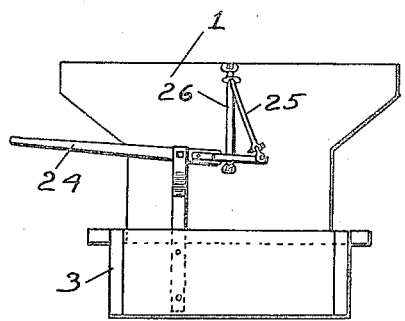
Fig. 4 is a view of the front end of the dumping body.

Sometimes it requires considerable force to start the loaded body from its horizontal position to the tilted position shown in Fig. 2, and to provide the desired leverage I may employ a hand lever 24 connected by a swiveled link 25 to a bracket 26 fixed to the body 1. The upper end of swiveled link 25 may slide freely up and down on the bracket, as indicated in Figs. 2 and 4, and the swiveled link 25 accommodates itself to the angular movement of the body 1 and also to its vertical movement while tilting.

As a modified means for tilting the body and restoring it to its horizontal position I may employ the device shown in Figs. 7 to 9 inclusive, which consists in a pair of coil springs 27 fixed to a rocking shaft 28, which is mounted on the sills 3. The shaft is adapted to be rocked by an outwardly projecting arm 29, to the upper end of which is pivoted a link 30, operated by a quadrant lever 31, within reach of the driver.

To tilt the body, the driver after having released the strut 13 by means of the lever 18, pulls back the lever 31 in the event that the load is not properly distributed, but in case the load is evenly distributed in the body, the body will automatically tilt when the strut 13 is released.

To restore the body to its horizontal position after dumping, the operator forces the quadrant lever 31 forward, rocking the shaft 28 and yieldingly forcing the empty body 31 into its horizontal position by means of the spring 27.

By the means above described, I have produced a simple and inexpensive dumping body that can be readily attached to an existing form of wagon or motor truck. The body is positively locked, not only in its horizontal position, but also in its tilted position, and is easily unlocked by the operator when in either one of its positions, and can be readily moved to the other position.

In the forms shown in Figs. 7 and 8, all of these operations can be controlled by the operator without leaving his seat.

Having thus described my invention, what I claim and desire to secure by Letters Patent is:

1. In combination, a tiltable vehicle body having a swinging end door, a latch device for said door, a stationary frame member, a bar hinged at its lower end to said stationary frame member, the upper end of said bar adapted to releasably engage and lock the end of said body against tilting when said body is in its horizontal position.

2. In combination, a tiltable vehicle body having a swinging end door, a stationary frame member, a latch device for said door adapted to engage said frame member when said body is tilted and to automatically unlatch said door, a strut hinged at its lower end to said stationary member, a strut-engaging lug on the end of said body above said door, and a rocking bar adapted to disengage the upper end of said strut from said lug.

3. In combination, a tiltable vehicle body having a swinging end door, a stationary frame member, a latch on said door, an arm pivotally connected to said latch and adapted to engage said stationary member to withdraw said latch when said body is in tilted position, a strut hinged at its lower end to said stationary member, the upper end of said strut adapted to releasably engage the end of said body, a lug near the lower end of said strut, a hinged bracket releasably engaging said lug in the tilted position of said body, a rocking bar adapted to disengage the end of said strut and said body, when the body is horizontal, and to disengage said lug and said bracket when the body is tilted.

In testimony whereof, I affix my signature in presence of two witnesses.

CIVILIAN J. THORNTON.

Witnesses:
W. E. HUNT,
F. J. HARBIN.